(12) United States Patent
Meyer-Noack

(10) Patent No.: US 9,056,428 B2
(45) Date of Patent: Jun. 16, 2015

(54) MANUFACTURING METHOD FOR HOLLOW COMPONENTS MADE OF FIBER COMPOSITE MATERIALS IN TUBULAR DESIGN, TUBULAR FILM AND MANUFACTURING METHOD FOR A TUBULAR FILM

(75) Inventor: Sven Meyer-Noack, Donauwörth (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 889 days.

(21) Appl. No.: 13/120,887

(22) PCT Filed: Sep. 29, 2009

(86) PCT No.: PCT/IB2009/006979
§ 371 (c)(1),
(2), (4) Date: Jul. 8, 2011

(87) PCT Pub. No.: WO2010/035125
PCT Pub. Date: Apr. 1, 2010

(65) Prior Publication Data
US 2011/0253299 A1 Oct. 20, 2011

(30) Foreign Application Priority Data
Sep. 29, 2008 (DE) .......................... 10 2008 049 359

(51) Int. Cl.
*B32B 37/10* (2006.01)
*B29C 70/44* (2006.01)
(Continued)

(52) U.S. Cl.
CPC ......... *B29C 70/446* (2013.01); *Y10T 428/1334* (2015.01); *B29C 43/10* (2013.01);
(Continued)

(58) Field of Classification Search
CPC .............. B29C 2043/3222; B29C 2043/3644; B29C 2791/006; B29C 2791/007; B29C 43/10; B29C 43/18; B29C 49/20; B29C 53/30; B29C 53/48; B29K 2105/0872; B29K 2105/258

USPC .................. 156/285; 264/514, 516, 520–523, 264/544–546, 548
See application file for complete search history.

(56) References Cited

U.S. PATENT DOCUMENTS 4,721,593 A * 1/1988 Kowal .......................... 264/258
5,129,813 A 7/1992 Shepherd
(Continued)

FOREIGN PATENT DOCUMENTS

CN 1630577 A 6/2005
CN 101038054 A 9/2007
(Continued)

OTHER PUBLICATIONS

Full translation of JP 58008616.*
(Continued)

*Primary Examiner* — Christopher Schatz
(74) *Attorney, Agent, or Firm* — Brooks Kushman P.C.

(57) ABSTRACT

A method having the following steps: feeding a plastic material in the area of an inner surface of the mold, conforming the material to the inner surface of the mold, feeding a tubular film into the mold so that the material is positioned between an outer surface of the tubular film and the mold, expanding the tubular film using pressure and/or a vacuum, applying a pressure above atmospheric pressure and/or heating the mold so that the material is partly or completely melted and is adapted to conform to an inner contour of the mold and an outer contour of the expanded tubular film. The tubular film is shaped before it is fed into the mold. The invention further relates to a tubular film (1) and a method for manufacturing the same.

18 Claims, 4 Drawing Sheets

(51) Int. Cl.
*B29C 43/10* (2006.01)
*B29C 43/18* (2006.01)
*B29C 49/00* (2006.01)
*B29C 49/04* (2006.01)
*B29C 49/20* (2006.01)
B29C 53/30 (2006.01)
B29C 53/48 (2006.01)
B29C 43/32 (2006.01)
B29C 43/36 (2006.01)
B29K 105/08 (2006.01)
B29K 105/12 (2006.01)
B29K 105/00 (2006.01)
B29L 23/00 (2006.01)
B29L 31/30 (2006.01)

(52) U.S. Cl.
CPC ............ *B29C 43/18* (2013.01); *B29C 49/0073* (2013.01); *B29C 49/04* (2013.01); *B29C 49/20* (2013.01); *B29C 53/30* (2013.01); *B29C 53/48* (2013.01); *B29C 2043/3222* (2013.01); *B29C 2043/3644* (2013.01); *B29C 2049/2017* (2013.01); *B29C 2049/2065* (2013.01); *B29C 2791/006* (2013.01); *B29C 2791/007* (2013.01); *B29K 2105/0872* (2013.01); *B29K 2105/128* (2013.01); *B29K 2105/258* (2013.01); *B29L 2023/00* (2013.01); *B29L 2031/3088* (2013.01)

(56) References Cited

U.S. PATENT DOCUMENTS

| | | | |
|---|---|---|---|
| 6,612,340 | B1* | 9/2003 | Lause .............................. 138/98 |
| 2003/0104156 | A1 | 6/2003 | Osada et al. |
| 2004/0149341 | A1* | 8/2004 | Driver .............................. 138/98 |
| 2005/0073069 | A1 | 4/2005 | Haraguchi et al. |

FOREIGN PATENT DOCUMENTS

| | | |
|---|---|---|
| DE | 102006031323 A1 | 1/2008 |
| DE | 102006031335 A1 | 1/2008 |
| JP | 580008616 A | 1/1983 |

OTHER PUBLICATIONS

Search Report and Written Opinion; Application No. PCT/IB2009/006979; dated Oct. 28, 2010.
The State Intellectual Property Office of the People's Republic of China Notice of the First Office Action (PCT Application in the National Phase), Dated Jan. 5, 2013, Application No. 200980139131.5, Applicant Eurocopter Deutschland GmbH, 13 pages.

* cited by examiner

Figure 1 - Prior Art

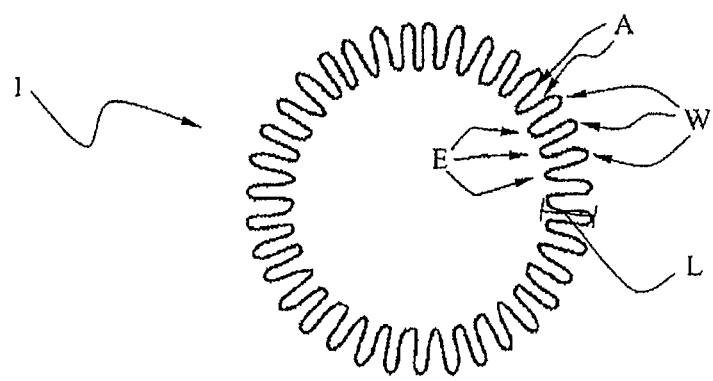
Figure 2
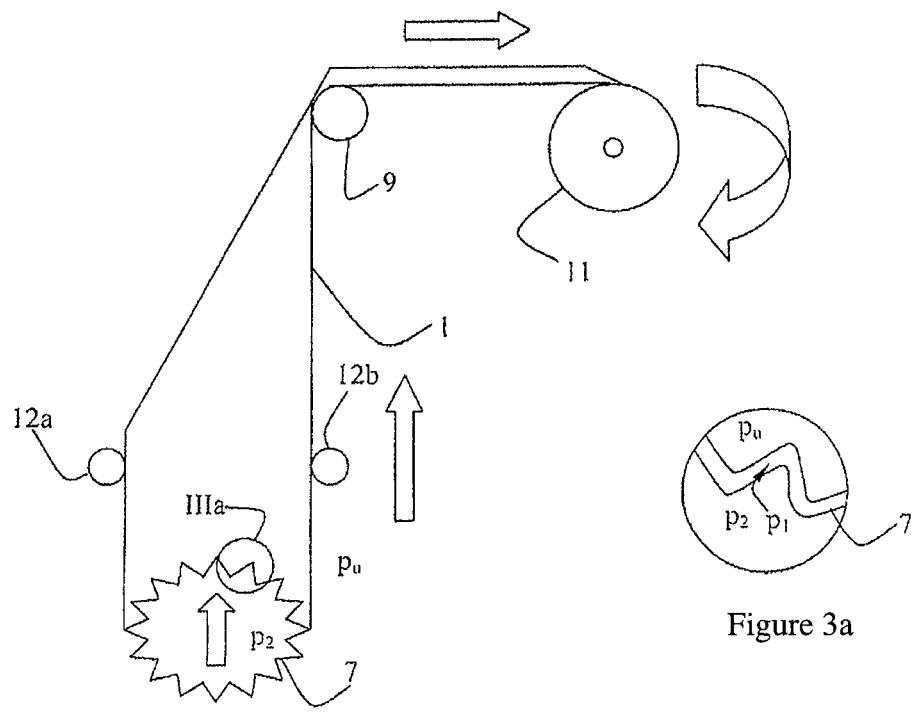
Figure 3a
Figure 3

MANUFACTURING METHOD FOR HOLLOW COMPONENTS MADE OF FIBER COMPOSITE MATERIALS IN TUBULAR DESIGN, TUBULAR FILM AND MANUFACTURING METHOD FOR A TUBULAR FILM

CROSS REFERENCE TO RELATED APPLICATION

This application is the U.S. national phase of PCT application no. PCT/IB2009/006979 filed Sep. 29, 2009 which claims priority to German application DE 10 2008 049 359.7 filed Sep. 29, 2008.

BACKGROUND OF THE INVENTION (1) Technical Field

The invention relates to a manufacturing method for hollow components using a tubular film and a mould.

(2) Description of Related Art

Hollow components, particularly those used in the aerospace industry, such as door elements on helicopters, are often manufactured in the manner described above. In this context, a mould usually consists of at least two complementary, bowl-shaped tool parts, into which a plastic material is fed for shaping. The tubular film is placed in one of the tool parts that has been covered with a base material before it is sealed off into a hollow body with the second or additional tool parts. Plastic materials include both materials consisting entirely of plastic and composite materials containing plastics, particularly fibres that contain plastics. The steps a) and b) of feeding and conforming the plastic working material are usually carried out before steps c) to d). However, injection methods are also known in which a hot, flowable material including a plastic is injected into a mould in which the tubular film has been fed and possibly expanded, between the outer surface of the tubular film and the inner surface of the mould.

For reasons of cost, a tubular film with a cross section that is adaptable thereto is not normally used even for hollow parts, for example with variable cross sections, or in components having complex hollow part geometry, instead a tube with constant cross section is used. Accordingly, the tube must be capable of expanding variably to ensure that pressure is applied to the material evenly, including in component corners that are difficult to reach. Problems can arise particularly in these zones: it is possible that the yield strength of the tubular film used may be exceeded, so that it is no longer possible to exert sufficient compression on the work materials. Ultimately, further expansion may cause the tubular film to tear. In both cases, the result is a rejected component, which is expensive.

Previously, this problem has been addressed essentially by using a somewhat oversized tube with a simple fold, usually into a Z shape. Even so, complex components constantly suffer from inadequate compression of the materials or over-expansion of the tube.

The document JP 58008616 A discloses a method how to perform molding with fidelity to a mold, by inserting a freely expandable hollow tubular member shaped with an elastic material into a tubular member having a concave part and a cross-sectional shape except a circular shape, then placing it in a mold, expanding the hollow tubular member, heating the tubular member and adapting it to a shape of the mold. By doing so, flash in the mold does not generate at a curved part and molding can be done according to the mold.

The document DE 102006031335 A1 discloses a process to manufacture an aircraft fuselage stringer in composite material, a form core has a hollow profile with longitudinally segmented folding sides. The form core is converted as required from open to closed (A) presentation for carbon fiber layup. On completion of the fiber and resin layup process, the material and form core are subject to heat and pressure for the duration of the curing process. The form core sides have interlocking profiles defining the external shape of the closed unit. The closed unit is retained in the closed presentation e.g. by welding. The form core is a plastic extrusion.

The document U.S. Pat. No. 5,129,813 A discloses a vacuum bag including a non-porous material having impressed therein a three-dimensional pattern which defines a plurality of interconnected channels, methods for producing the vacuum bag, molding methods using the vacuum bag, and improved composite articles produced by the molding method.

The document US 2003104156 A1 discloses a composite material, which can be used as an alternative material to a prepreg, comprising a dry substrate fabric sheet, and at least a thermosetting resin thin film being attached to one of the surface of the substrate fabric sheet. The substrate fabric sheet is thick and a multi-axial laminate structure formed by laying up a plurality of aligned fiber plies, and is not impregnated with resin previously.

The document DE 102006031323 A1 discloses a method for producing a fibre composite component, in particular for aerospace, having the following method steps: forming a moulding core from a core material with a predetermined narrow melting range in a moulding tool to establish an outer geometry of the moulding core at least partly laying at least one semifinished fibre product on the moulding core that is formed, for the shaping of at least one moulded portion of the fibre composite component to be produced; and multistage exposure of at least the moulded portion to heat and/or pressure to produce the fibre composite component; a corresponding moulding core for producing such a fibre composite component and a corresponding fibre composite component with at least one stringer.

SUMMARY OF THE INVENTION

The object of the invention is therefore to provide an improved, particularly simplified, reliable method for manufacturing even complex hollow components using tubular films.

This object is solved according to the invention with a manufacturing method including the following steps: a) feeding a plastic material in the area of an inner surface of the mould, b) conforming the material to the inner surface of the mould, c) feeding a tubular film into the mould so that the material is positioned between an outer surface of the tubular film and the mould, d) expanding the tubular film using pressure and/or a vacuum, e) applying a pressure above atmospheric pressure and/or heating the mould so that the material is partly or completely melted and is adapted to conform to an inner contour of the mould and an outer contour of the expanded tubular film. The invention further relates to a tubular film for manufacturing hollow components and a manufacturing method therefor.

The tubular film is shaped and/or folded before it is fed into the mould in such a way that its contour in a plane perpendicular to its longitudinal extension has a plurality of recesses, preferably distributed evenly about its circumference. The recesses alternate with the same number of protuberances that are arranged between the recesses. The tube casing may be folded to form creases or corrugations. A plurality of recesses is understood to mean more than three, preferably more than seven, and especially more than 10 recesses. The greater the number of recesses and protuberances the tubular film has, the better it is able to lie flush against the entire surface of even complicated cavity geometries:

If a tubular film according to the invention is fed into a mould and then exposed to blowing, initially only the ends of its protuberances rest on the material that is used for manufacturing a hollow component. As it expands further, the recesses between the protuberances begin to unfold. Thus, the recesses may be inverted into place to conform to the cross section of the hollow component and the tubular film does not have to move along the material it is in contact with, particularly the ends of the protuberances that are already lying flush with it. Accordingly, no more than a slight relative movement or friction is created with respect to this material. Most of the adapting movement of the tube takes place as its own outer surfaces slide over each other in the area of the recesses. Accordingly, the ability of the tubular film to adapt to the cross section surrounding it increases not only with the number of its protuberances or folds, but also with length.

The tubular film of the invention may thus be used with extremely complicated hollow parts, for example even for components with hubs, that is to say areas of three or more hollow shapes that converge at a single point. The tubular film of the invention may be expanded further by its contouring and lower frictional forces and is able to adapt more flexibly to complex geometries than those that are known. It easily reaches into corners and even behind overhangs, for example undercuts or abrupt changes in cross section.

The tubular film may be formed for example by folding. In this case, the desired contour is created effectively afterwards, in a separate processing step. On the other hand, according to a preferred embodiment of the invention the recesses may be imprinted on the tubular film as it is being manufactured, with the result that the tubular film has a wavy cut contour when it is slackly inflated. This cut contour preferably has an evenly undulating shape, but this is not essential. Since shaping takes place while the tubular film is being manufactured, a separate postprocessing step to create the folds or waves is not necessary. As a result, manufacturing the tube is simpler and less expensive.

The shaping of the tubular film enables the tube to expand uniformly even into corner areas of hollow components and transition zones between different cavity cross sections. Because of its corrugation, it outer diameter when inflated is larger than the diameter of the inside of the mould; the tubular film is thus oversized or overdimensioned.

The invention offers particular potential in the field of manufacturing hollow components with fibre composites, so this application will be emphasised in the following discussion. In this case, the material includes a fibre composite material having fibre layers. Such fibre layers are characterized by increased static friction, so that a tubular film slides over them very poorly. Accordingly, the fibre composite construction is associated with a significantly higher risk of rejects in production than for other materials, such as molten plastics, which for example may be injected onto the inner surface of the mould in an injection moulding process.

It is preferable to use a tubular film from a strip of endless material. Thus, the tube is preformed, and is usually supplied on a roll. The requisite sections of tubular film may then be cut to length individually—either in advance or during the manufacturing process. In this way, a number of different hollow components of various lengths may be produced from the same tubular film material.

In order to bond the fibre layers together, matrices may preferably be placed between the tubular film and the inner surface of the mould. Matrices are substances that melt (thermoplastics) or crosslink (duroplastics) at higher temperatures and bond with the surface of the fibre layers. The matrices serve as intermediaries between the fibre layers and are instrumental in consolidating the component into a compact, properly shaped plastic element with no air bubbles. They also improve the mechanical strength of the system as a whole.

If duroplastics are used, the resulting hollow part is extremely stable. Alternatively, duromer and/or other thermoplastics or ceramic materials may be used as matrices depending on the intended application for the hollow part that is to be made. Composites with ceramic substances are undoubtedly expensive to make, but they are the items of choice for special applications that demand outstanding resistance to a wide range of environmental influences. According to a first variant of the method, fibre layers with the matrix already applied are fed into the mould. These are referred to as pre-pregs, that is to say composites of fibres and matrices that are available as prefabricated composite raw materials.

In another method, dry, precut fibre layers, known as preforms, are fed into a form with the tubular film, the form is sealed and depressurised. Then, a flowable matrix is fed into the fibre layers.

Alternatively, the matrices may be introduced between the tubular film and the inner surface of the mould. This is preferably carried out in an injection process, in which the matrices, which are usually heated, are encouraged to permeate the fibre layer zone under increased or reduced pressure. Fluid impregnation (LCM: liquid composite moulding) processes of such kind, for example resin transfer moulding (RTM), are used preferably for manufacturing large quantities of parts, because this manufacturing process lends itself well to automation. They are also applied if special combinations of fibre layers and matrices that are not available as pre-pregs are required, and sometimes to cut costs, because pre-pregs tend to be more expensive.

According to a particularly preferred embodiment of a method according to the invention, the outer surface of the tubular film is provided with an anti-adhesive coating, and at the end of the process it is removed from the hollow part so that it may be reused. The anti-adhesive coating makes it easier to detach the tubular film from the surface of the cavity in the hollow component. When it is no longer expanded or pressurized, the tube can be extracted more easily from the finished hollow component and reused in the production of other hollow components. This results in significant savings of tubular film material, which is only possible because the tubular film is exposed to less significant stresses in the method according to the invention. It may be necessary to restore the tube to its inventive shape by reforming before it can be used again. This may prove necessary particularly with folded tubular films.

The object is also solved with a tubular film of the type described in the introduction that is shaped such that its contour in a sectional plane perpendicular to its longitudinal extension is furnished with a plurality of recesses distributed about its circumference and extending in the direction of its longitudinal extension. In this case, the recesses of the tubular film may be formed by folding and/or by imprinting. Folding creates V-shaped recesses, whereas imprinting tends to create a wavy sectional contour.

A tubular film of this kind preferably has a film thickness of less than 2/10 mm, particularly less than 1/10 mm. It is preferably made from polyamide or polyamide compounds. With such a film thickness, and/or with this material, it may be assured that the tubular film's stability, expansion and sliding properties will enable it to be used for manufacturing hollow components in the method according to the invention without tearing. The thin film thickness and/or the polyamide material particularly enhance the effects described above, of being able to seep into very tight corners and slide over its own film surface, and improved expansion capability for larger cavity cross sections while retaining exceptional flexibility.

In this case also, the film thickness and material of the tubular film are preferably configured so that it may be reused multiple times for a hollow part manufacturing process according to the invention. For this purpose, it may also be provided with an anti-adhesive coating on its outer surface.

A tubular film of this kind may be manufactured in three fundamentally different processes: a first variant provides for annular extrusion and contouring and/or folding the tubular film. The tubular film is thus produced as a tubular structure with the aid of the extrusion ring. This extrusion ring consists of an annular ring nozzle, from which the molten film material is squeezed. The molten material is placed under pressure with compressed air, which causes it to expand. An inflated endless tubular film is created, which may be drawn off and rolled up continuously. As a result, the tubular film is produced without seams, and is thus without any inherent weak spots that are usually caused by connection areas. Contouring or folding after annular extrusion does not involve any significant additional steps, and may even be completed immediately in the same machine cycle.

Contouring may also be carried out during the annular extrusion process by using an extrusion nozzle with a shape that determines the contour of the tubular film. In this case, the contour of the ring nozzle is corrugated or is conformed with bulges so as to determine the wave shape of the tubular film. Contouring of this kind at the same time as extruding is extremely simple and renders further process steps unnecessary.

Alternatively or in addition to this, contouring may be carried out by imprinting, preferably using rollers that are pressed against In the tubular film. In this case, the extrusion nozzle may also be a conventional, round nozzle. The tube is preferably imprinted during the cooling down phase, while it is still soft. Suitable contouring tools such as guide rollers leave tracks in the tubular film, preferably while it is still hot and easily deformed, thereby imprinting the desired contour in the tubular film after the annular extrusion process.

According to a second variant, a tubular film according to the invention may be produced by a manufacturing process in which a flat film material is contoured and then bonded with a contoured tubular film by joining two longitudinal sides thereof. This contouring method, for example hot stamping a flat film material is particularly useful for creating highly complex contour geometries. For example, a wavy cut contour may be created at an angle to the tube's advance. It is even possible for it to be corrugated along this direction of advance and/or intermittent and/or varied along the longitudinal axis, so that a tubular film may be constructed with a contour that is configured perfectly for use in a manufacturing a given component. The width of the flat film material may also be varied perpendicularly to the longitudinal direction, creating a tubular film that may have different cross sections. A manufacturing method of such kind certainly tends to be more complicated than the continuous production method described above, but is has the advantage of allowing more complex tube geometries and special contour configurations.

A third variant for manufacturing a tubular film according to the invention consists in using a round tubular film, that is to say a conventional tubular film having a profile that is essentially round, preferably circular in a sectional plane perpendicular to its longitudinal extension, unrolling the film from a roll, expanding it under pressure and/or in a vacuum then contouring or folding it. In this case, the round tubular film is preferably contoured with a heated guide tool, through which the entire length of the tube material passes.

This third variant thus effectively represents contouring a conventional round tubular film subsequently, such as is already being used in the prior art. After being unwound from the roll, the round tubular film is guided through a forming guide tool and contoured in this way. It may then either be wound onto another roll or used immediately in a method according to the invention for manufacturing hollow components.

The principle of the invention will be described in greater detail in the following, with reference to the drawing for exemplary purposes. In the drawing:

BRIEF DESCRIPTION OF THE DRAWINGS

FIG. 2 is a cross section of an embodiment of a tubular film according to the invention, FIG. 3 is a concept diagram of a first variant of a method for manufacturing a tubular film according to the invention.

DETAILED DESCRIPTION OF THE PREFERRED EMBODIMENT

Figure 1:
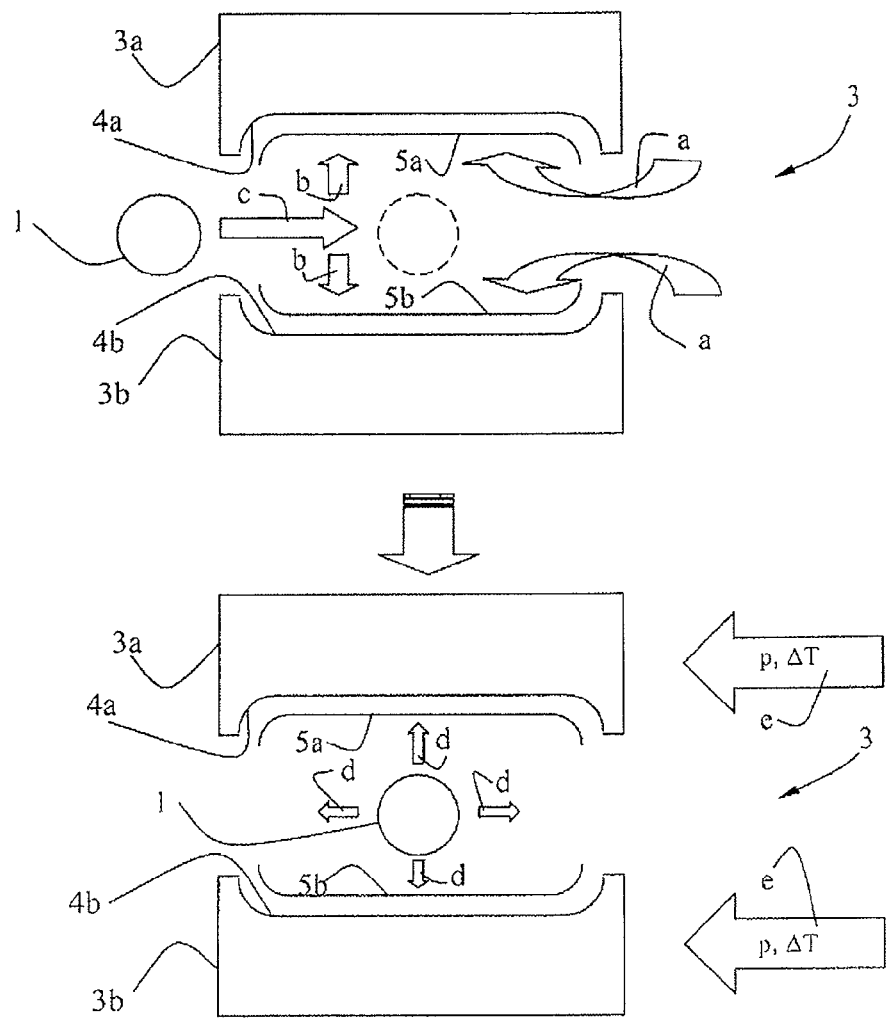
FIG. 1 is a schematic diagram of a process flow of a method according to the prior art.

FIG. 1 represents a process flow of a known method for manufacturing a hollow component. Accordingly, in a first step a, fibre layers 5a, 5b are fed manually or by machine into two bowl-shaped tool parts 3a, 3b, which together constitute mould 3.

In a second step b, fibre layers 5a, 5b are conformed mechanically on inner surfaces 4a, 4b of tool parts 3a, 3b, that is to say they are pressed against them and possibly bonded together. Bonding is not usually necessary, however, because fibre layers that have been pre-impregnated, for example with duroplastic matrices, already have a certain tack, and adhere to each other adequately without the need for further measures. This is particularly true in the present case, in which fibre layers 5a, 5b are constructed as pre-pregs and therefore also have a matrix element, for example resins, as well as the fibres.

In a third step c, a tubular film 1 is fed into mould 3. It is positioned on the side of fibre layers 5a, 5b opposite surfaces 4a, 4b.

In a fourth step d, tubular film 1 is expanded. Tubular film 1 usually expands after mould 3 has been closed, that is to say when tool parts 3a, 3b are joined together. For illustrative purposes—to indicate the directions of expansion—it was decided to show tool parts 3a, 3b open in this figure.

The last method step e, applying pressure p and/or increased temperature ΔT to mould 3, and thus also to fibre layers 5a, 5b, also takes place with mould 3 closed. In this step, fibre layers 5a, 5b are "fused" together using the fused material contained therein, producing a solid, compact component.

Two different types of pressure are at work in the forming process: on the one hand the pressure from tubular film 1 in one direction only, specifically against surfaces 4a, 4b of mould 3, and on the other hand pressure p which works in all directions. The pressure from tubular film 1 compresses fibre layers 5a, 5b, together with the fused materials, against surfaces 4a, 4b. This creates a smooth surface, particularly on the outer surface of the component that is being made. The pressure p that operates in all directions helps to cure the material and is usually accompanied by an increase in temperature $\Delta T$.

FIG. 2 shows a cross section of a tubular film 1 according to the invention. Instead of a circular outer contour as in FIG. 1, this cross section is furnished with recesses E and corresponding protuberances W. Recesses E may be created by permanent shaping methods such as imprinting or by appropriate folding of tubular film 1. Recesses E and protuberances W combine to form filaments having outer surfaces A around the circumference of tubular film 1. They have a length L between the crests of recesses E and the neighbouring protuberances W. This length may be varied during moulding. If tubular film 1 is placed in a mould 3 with fibre layers 5a, 5b (see FIG. 1), initially only the protuberances W come into contact with fibre layers 5a, 5b. As the tube expands, recesses E between protuberances W unfold. They are inverted into place without tubular film 1 having to move along fibre layers 5a, 5b, particularly the ends of protuberances W, which are already lying against the layers. During expansion, it offers them only a small surface area for contact and friction, while most of the adaptation movement of tubular film 1 is caused by its own outer surfaces A sliding over each other in the area of recesses E. The longer the length L, the more film material can be unfolded without causing any relative movement between protuberances W and fibre layers 5a, 5b. By choosing a suitable material—the tube is preferably made from polyamide—and particularly by applying an anti-adhesive coating to outer surface A of tubular film 1, the friction at this point may be minimized. This makes it easier for the elements to slide and for tubular film 1 to expand, so that it is able to reach into all corners of the mould for complicated component shapes. This helps to reduce the danger that tubular film 1 may become overstretched or even tear. On the other hand, an excessive amount of film material does no harm. It remains as a crease inside tubular film 1 and has no effect on fibre layers 5a, 5b.

Since the tubular film 1 according to the invention is exposed to smaller stresses per unit of area during unfolding because of its oversize and the large number of recesses E, it may be provided with a thinner wall. This does more than just save film material. Because of the smaller film thickness, the edges on the inner surface of the component that remain on the folds of the tube, extending away from the inner surface of the component, are also smaller. Moreover, since tubular film 1 is folded many times, the edges are distributed essentially evenly over the entire inner surface. This improves the "macroscopic" evenness of the component's inner surface. This in turn makes later assembly steps easier, for example attaching rivets, which no longer tilt.

FIGS. 3 to 6 show variants of methods for manufacturing a tubular film 1 according to the invention.

FIG. 3 is a highly schematic representation of a method for manufacturing a tubular film 1 using an extrusion nozzle 7. It is shown enlarged as a detail view of a section of extrusion nozzle 7 in FIG. 3a. The special feature of this method is the shaping function of extrusion nozzle 7, which is not round but instead has a wavy, star-shaped contour. This is the contour it imparts to tubular film 1. Other contours, such as the wavy contour shown in FIG. 2, may also be created by designing the shape of extrusion nozzle 7 appropriately.

Molten extrudate exits through extrusion nozzle 7 under extrusion pressure p1. It is blown in the direction of the arrow (FIG. 3) with an air pressure p2, the value of which is greater than that of the ambient pressure $p_u$ that surrounds the extrudate. As a result, tubular film 1 is formed at the edge of extrusion nozzle 7 and its extension. It is guided by guide rollers 12a, 12b, getting cooler as the process advances, until it finally solidifies. Then, the finished tubular film 1 is redirected over a deflector roller 9 and wound onto a material roll 11 as an endless strip.

Figure 4:
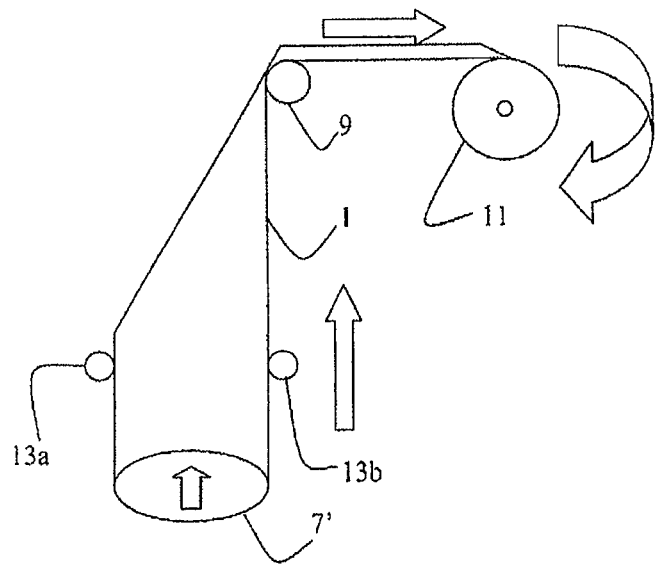
FIG. 4 is a concept diagram of a second variant of a manufacturing method.

Another method is shown in FIG. 4, and unlike FIG. 3, in this case a round extrusion nozzle 7' is used. Two (or more) guide rollers 13a, 13b are used for shaping, they not only guide tubular film 1, but they are also shaped such that they impart an imprint with recesses on it before it cools down and cures, Guide rollers 13a, 13b are arranged around the whole circumference of tubular film 1, and thereby create a large number of uniform, filament-like imprints.

Figure 5:
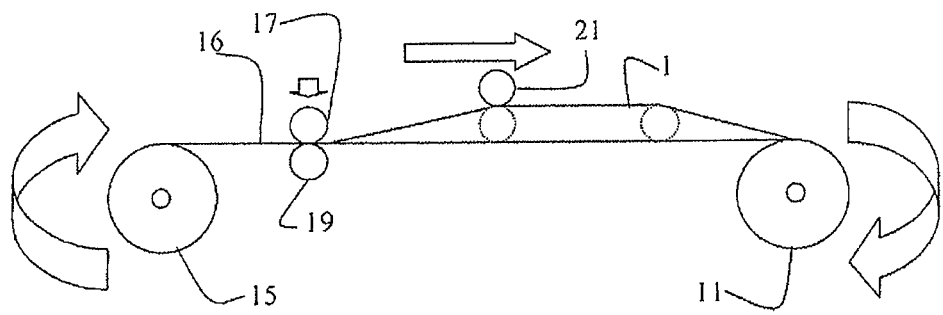
FIG. 5 is a concept diagram of a third variant of a manufacturing method.

FIG. 5 shows a further variant of a method for manufacturing a tubular film 1 according to the invention. A flat, strip-like length of film material 16 is unrolled from a raw material roll 15 and fed through a guide roller 19 and a shaping roller 17 arranged opposite the guide roller. Shaping roller 17 imprints a contour in film material 16, as is shown in FIG. 2. Then, the two lengthwise edges of film material 16 are brought together so that they overlap and bonded with each other in a bonding station 21. This may be done for example by fusing or adhesion. A tubular film 1 is produced, which again is wound onto a material roll 11 for endless material.

Figure 6:
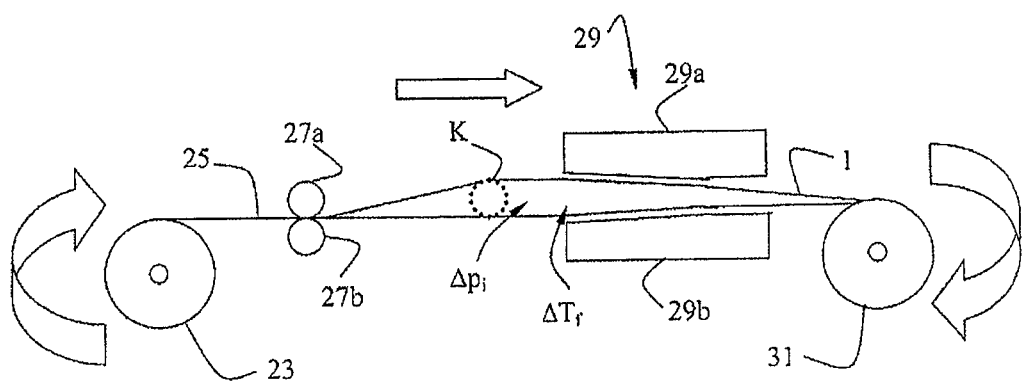
FIG. 6 is a concept diagram of a fourth variant of a manufacturing method.

FIG. 6 shows a variant of a method for manufacturing a tubular film 1 according to the invention based on a prefabricated round tubular film 25 that is positioned upstream on a material roll 23. It has a circular profile K, that is to say the round tubular film 25 is a conventional tubular film, such as has been used in the prior art for manufacturing hollow components. In this case it is processed further to produce a tubular film 1 according to the invention.

For this, round tubular film 25 is unwound from material roll 23 over two guide rollers 27a, 27b and expanded with inflating pressure $\Delta p$. Expanded round tubular film 25 is fed into a guide tool 29. Guide tool 29 is a matrix having a high temperature $\Delta T_f$, which in the vertical section shown here consists of an upper part 29a and a lower part 29b, and surrounds the tubular film in the manner of a cylinder. In guide tool 29, round tubular film 25 is heated until it is malleable. A contour is imparted to it, thereby producing a tubular film 1 according to the invention. Tubular film 1 may then be wound onto a receiving roll 31. It is also possible for the round tubular film 25 to be folded instead of or in addition to contouring in guide tool 29.

Receiving roll 31 is only necessary if the finished tubular film 1 is not intended for immediate use in the process for manufacturing hollow components, but instead is to be stored initially. Equally, instead of winding it onto a roll, tubular film 1 may also be separated or parts thereof may be cut to length, for example with stamps or cutting tools, so that previously prepared tubular films 1 are readily available for the hollow component manufacturing process. Incidentally, this separation option is also possible for the variants for manufacturing tubular films 1 described earlier.

Since the methods described in detail previously are exemplary embodiments, they may be modified in many different ways by anyone skilled in the art without departing from the scope of the invention. In particular, conformations other than those specifically described here may be applied to the tubular film. Moreover, the use of the indefinite article "a" does not imply that several of the features in question may not be present at the same time.

LEGEND

1 Tubular film
3 Mould
3a, 3b Mould sections
4a, 4b Inner surfaces
5a, 5b Fibre layers/Prepregs
7, 7' Extrusion nozzles
9 Deflector roller
11, 23 Material rolls
12a, 12b, 13a, 13b,
19, 27a, 27b Guide rollers
15 Raw material roll
16 Flat film material
17 Forming roll
21 Bonding station
25 Round tubular film
29, 29a, 29b Guide tool (upper and lower parts)
31 Receiving roll
a, b, c, d, e Process steps
$p_1$ Extrusion force
$p_2$ Air pressure
pu Ambient pressure
A Outer surface
E Recesses
K Profile
L Length
W Protuberances
p Pressure
$\Delta pi$ Inflation pressure
$\Delta T, \Delta T_f$ Elevated temperature

The invention claimed is:

1. A manufacturing method for manufacturing a hollow component for an aerospace element, the aerospace element having a variable cross section and corners and being manufactured by conforming a plastic material preform, the method using a tubular film and a mould having inner surfaces with corresponding variable cross sections and corners, the method having the following steps:
   a) feeding a plastic material preform in the area of the inner surfaces of the mould, the plastic material preform having a first fiber layer and a second fiber layer;
   b) conforming the plastic material preform to mechanically conform to the inner surfaces of the mould;
   c) feeding a tubular film into the mould so that the plastic material preform is positioned between an outer surface of the tubular film and the mould, the tubular film being unwound from a roll, expanded by pressure and/or a vacuum, and then contoured by a guide tool before it is fed into the mould in step c) such that its contour in a sectional plane perpendicular to its longitudinal extension is furnished with an outer contour with a plurality of recesses alternating with a plurality of protuberances distributed about its circumference and extending in the direction of its longitudinal extension, the tubular film being fed from an endless roll;
   d) expanding the contoured tubular film using pressure and/or a vacuum when the inner surfaces of the mould are joined together, the expanding of the contoured tubular film being performed without the contoured tubular film having to move along the plastic material preform, the protuberances contacting the plastic material preform prior to the recesses; and
   e) applying a pressure above atmospheric pressure in the contoured tubular film and heating the mould so that the plastic material preform is adapted to fuse the fiber layers and conform the fiber layers to an inner contour of the mould and an outer contour of the expanded tubular film.

2. The manufacturing method of claim 1, wherein the plastic material preform further comprises matrices, the matrices comprising duromers or thermoplastics or ceramic substances.

3. The manufacturing method of claim 1, wherein matrices are fed into the mould together with the fiber layers.

4. The manufacturing method of claim 1, wherein matrices are introduced between the tubular film and the inner surface of the mould after step c) has been carried out.

5. The manufacturing method of claim 1, wherein the outer surface of the tubular film is furnished with an anti-adhesive coating.

6. The manufacturing method of claim 1, wherein the tubular film has a film thickness of less than $2/10$ mm.

7. The manufacturing method of claim 1, wherein the tubular film is made from polyamide or polyamide compounds.

8. The manufacturing method of claim 6, wherein the tubular film has a thickness and material such that the tubular film can be used several times in the manufacturing method.

9. The manufacturing method of claim 1, wherein the guide tool is a heated guide tool and wherein at step (c) the tubular film is guided along its longitudinal extension by the heated guide tool and folded by the heated guide tool.

10. The manufacturing method of claim 6, wherein the tubular film has a film thickness of less than $1/10$ mm.

11. A method of manufacturing a hollow aerospace component, the method comprising:
   providing a mold having a first inner surface and a second inner surface, the first inner surface and second inner surface being joinable to cooperatively define a cavity with a variable cross section and internal corners;
   providing a composite preform comprising a first fiber layer and a second fiber layer;
   providing a tubular film having an outer surface defining an outer contour with a perimeter, the outer contour defining a plurality of recesses alternating with a plurality of protuberances about the perimeter, the tubular film including an anti-adhesive coating on the outer surface, wherein providing a tubular film comprises unwinding the tubular film from a roll, expanding the tubular film by pressure and/or a vacuum, and then contouring the tubular film with a guide tool to form the outer contour;
   conforming the first fiber layer to the first inner surface of the mold and the second fiber layer to the second inner surface of the mold;
   feeding the tubular film into the mold so that the first fiber layer is between the outer surface of the tubular film and the first inner surface of the mold and the second fiber layer is between the outer surface of the tubular film and the second inner surface of the mold;
   joining the first inner surface of the mold to the second inner surface of the mold;
   expanding the tubular film using pressure or vacuum; and
   applying pressure and heating the mold to fuse the first fiber layer and second fiber layer, conform the preform to the inner surface of the mold and the outer contour of the tubular film, and form a hollow part having a variable cross section and internal corners.

12. The method of claim 11, wherein contouring the tubular film with the guide tool comprises heating the tubular film in the guide tool until it is malleable.

13. The method of claim 11, further comprising removing the tubular film from the preform and reusing the tubular film in manufacturing a subsequent hollow aerospace component.

14. The method of claim 11, wherein applying pressure and heating the mold at least partially melts or crosslinks the preform.

15. The method of claim 1, wherein applying a pressure above atmospheric pressure and heating the mold partly or completely melts or crosslinks the plastic material preform.

16. A method of manufacturing a hollow aerospace component, the method comprising:
provoding a mold having a first inner surface and a second inner surface, the first inner surface and second inner surface being joinable to cooperatively define a cavity with a variable cross section and internal corners;
providing a composite preform comprising a first fiber layer and a second fiber layer;
providing a contoured tubular film having an outer contour defining a plurality of recesses alternating with a plurality of protuberances, the outer contour being imparted by unwinding the film from a roll, expanding the film by pressure and/or a vacuum, and contouring the film by a heated guide tool to form the outer contour;
conforming the first fiber layer to the first inner surface of the mold and the second fiber layer to the second inner surface of the mold;
feeding the contoured tubular film into the mold so that the first fiber layer is between the outer surface of the contoured tubular film and the first inner surface of the mold and the second fiber layer is between the outer surface of the contoured tubular film and the second inner surface of the mold;
joining the first inner surface of the mold to the second inner surface of the mold;
expanding the contoured tubular film using pressure or vacuum; and
applying pressure and heating the mold to fuse the first fiber layer and second fiber layer, conform the preform to the inner surface of the mold and the outer contour of the contoured tubular film, and form a hollow part having a variable cross section and internal corners.

17. The method of claim 16, wherein the outer contour of the contoured tubular film is imparted by the heated guide tool immediately prior to feeding the contoured tubular film into the mold.

18. The method of claim 16, wherein applying pressure and heating the mold at least partially melts or crosslinks the preform.

\* \* \* \* \*